United States Patent [19]
Bolash et al.

[11] Patent Number: 5,480,240
[45] Date of Patent: Jan. 2, 1996

[54] PRINT QUALITY ENHANCEMENT METHOD AND APPARATUS

[75] Inventors: John P. Bolash, Lexington; Curt P. Breswick, Georgetown; Thomas J. Eade; David K. Lane, both of Lexington; Randall D. Mayo, Georgetown; David S. Waldrop, Lexington, all of Ky.

[73] Assignee: Lexmark International, Inc., Greenwich, Conn.

[21] Appl. No.: 161,006

[22] Filed: Dec. 1, 1993

[51] Int. Cl.⁶ ........................................................ B41J 2/22
[52] U.S. Cl. ...................... 400/124.01; 395/108; 395/128
[58] Field of Search ....................... 400/124.01; 395/108, 395/109, 128, 110, 150, 151

[56] References Cited

U.S. PATENT DOCUMENTS

| | | | |
|---|---|---|---|
| 4,321,610 | 3/1982 | Moore et al. | 346/108 |
| 4,632,579 | 12/1986 | Takano et al. | 400/121 |
| 4,703,323 | 10/1987 | Troupes et al. | 340/790 |
| 5,016,195 | 5/1991 | Warp | 364/519 |
| 5,077,679 | 12/1991 | Williamson et al. | 395/105 |
| 5,149,212 | 9/1992 | Murakami | 400/279 |
| 5,270,728 | 12/1993 | Lund et al. | 400/121 |

*Primary Examiner*—Edgar S. Burr
*Assistant Examiner*—Steven S. Kelley
*Attorney, Agent, or Firm*—John J. McArdle, Jr.

[57] ABSTRACT

A print quality enhancement arrangement for a dot matrix printer such as a thermal ink jet printer. The arrangement includes a buffer for receiving 300 dots per inch (dpi) resolution data in the horizontal (print head movement) direction and creates 600 dpi resolution data using image enhancement techniques. The arrangement further includes correction of the higher resolution data to remove pels which are unprintable due to the frequency response of the print elements in the print head. The correction is performed using knowledge of the history of printed pels and the original 300 dpi data. The creation of the higher resolution data and its correction occur "on-the-fly" as data is being fed to the print head, rather than through the creation of a 300 by 600 dpi bitmap.

8 Claims, 8 Drawing Sheets

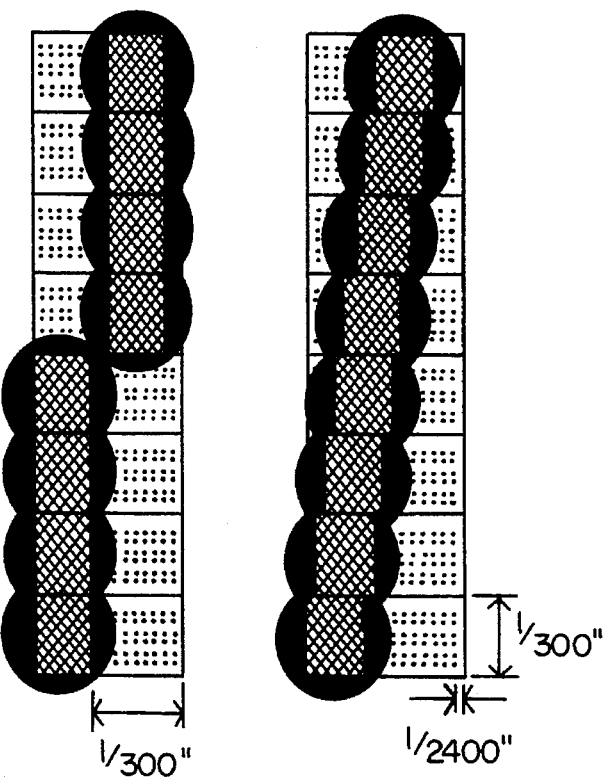
FIG. 1A   FIG. 1B
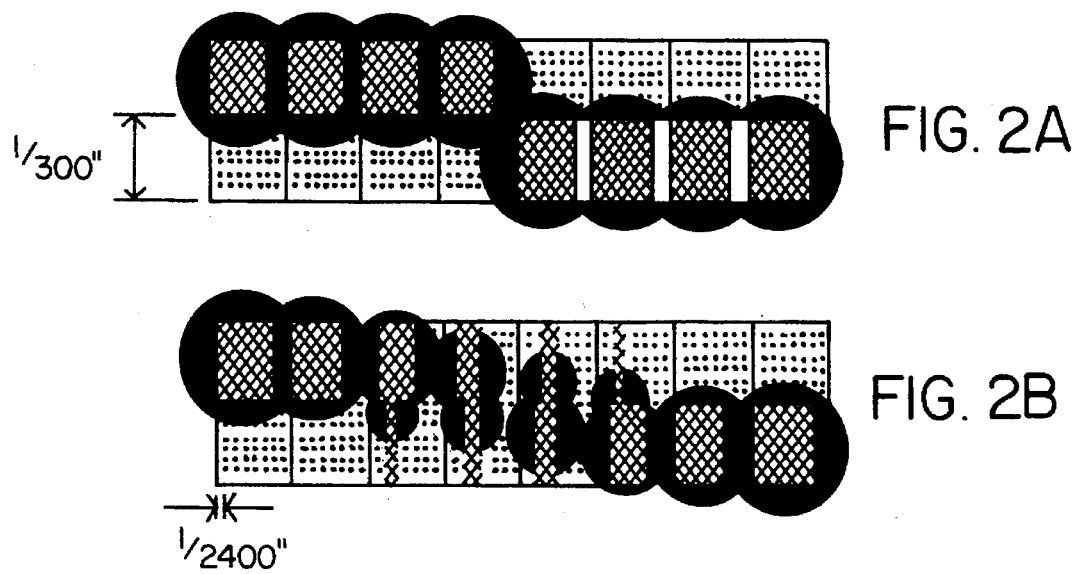
FIG. 2A
FIG. 2B

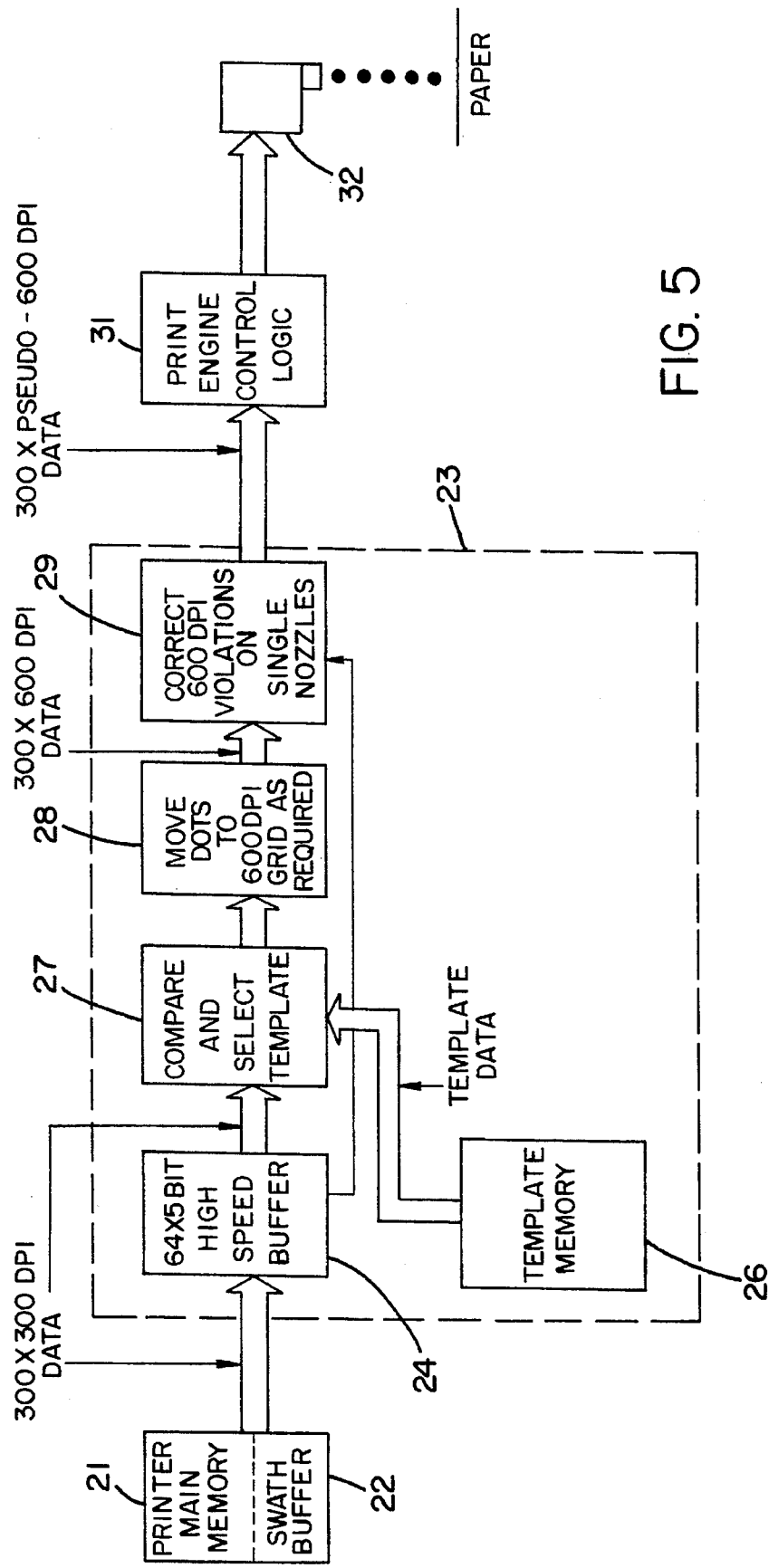

PRINT DATA SHOWN ON 600 DPI GRID

PRINT QUALITY ENHANCEMENT METHOD AND APPARATUS

BACKGROUND OF THE INVENTION

This invention is in the field of dot matrix printers and more particularly concerns a method and apparatus for improving the effective resolution of such a printer.

The invention will be described in relation to thermal ink jet dot matrix printers which, due primarily to frequency response limitations, have a particular maximum useable horizontal dot placement resolution. Many low cost thermal ink jet printers, for example, have resolutions of 300 dots per inch.

Thermal ink jet printers generate printed characters or graphics on a sheet of paper or other print medium by placing dots on a fixed matrix grid with a predetermined horizontal and vertical resolution. Many thermal ink jet printers in use today have a maximum resolution of 300 dots per inch (dpi) vertical by 300 dpi horizontal.

Some such printers store font data on a 300 dpi vertical by a pseudo 600 dpi horizontal grid to improve text print quality. While this approach does improve print quality for some text modes, it does nothing for graphics and text received in a bit-image mode and doubles the amount of memory required to store the font data because of the increased horizontal resolution.

Laser printers, which may also be considered dot matrix printers, have developed a number of resolution enhancement techniques. FIGS. 1 and 2 show techniques which are used to improve the print quality of a 300 dpi laser printer. In the illustrated example, in a 300 dpi laser printer, one type of "near vertical" (oblique or diagonal) line is approximated by staggering groups of four vertically stacked dots placed on a horizontal 1/300 inch grid. The dots are on a 1/300 inch grid because the maximum horizontal resolution of the data, either stored in memory or being received from the attached printer is 300 dpi. FIG. 1A shows this situation. FIG. 1B shows the printed result after the data has been post processed by smoothing hardware inside the laser printer. This hardware compares the incoming data with pre-stored templates, matching the best template with the incoming unsmoothed data. The template selected directs the printer control hardware to vary the start/finish of a laser flash on a 1/2400 inch grid. Once the smoothing hardware finds a match between incoming data and a template, it simply follows the laser flash control designated by the template to obtain the desired application of toner to obtain the best possible smoothing given the 1/2400 inch flash control. This method is also used to smooth near vertical black/white boundaries in the same fashion.

An example of smoothing of a "near horizontal" line is shown in FIG. 2. In this case the near horizontal line is approximated by four horizontally adjacent dots placed on a 1/300 inch vertical grid, since 1/300 inch is the maximum vertical resolution of the stored or received data. This situation is illustrated in FIG. 2A. In FIG. 2B, the incoming data is again compared to the stored templates until a match is found. The matching template then directs the laser control to vary the start/stop of the laser flash. The closer the time between the start and stop of the flash (the flash width), the smaller the toner dot that attaches to the drum. Also these smaller dots of toner are attracted to one another in the vertical direction. This attraction which causes the dots to tend to merge in the vertical axis is fundamental to obtaining smoothing of near horizontal lines or near horizontal black/white boundaries because it yields an ability to shift dot position on the vertical axis in a finer increment than 1/300 inch.

It is an objective of the present invention to describe a print quality enhancement method and apparatus which improves the apparent resolution of a printer such as a thermal ink jet dot matrix printer with a maximum horizontal resolution of some specified amount. In the embodiment of the invention to be described in detail hereinafter, the horizontal resolution is 300 dpi. The improvement to this resolution results in improved print quality performance in the printing of text characters and graphics that are oriented off of the vertical axis (near vertical features), such as in oblique text like italics. Correction for near horizontal features is not included because of the difficulty in ink jet technology of modulating the dot size and getting the dots to merge together, as was shown in the earlier explanation of near horizontal correction in laser printing. To obtain some degree of smoothing of near vertical print features only requires that the printed dot be shifted on a finer horizontal grid (such as 600 dpi) than the printer's specified maximum (for example 300 dpi). Spot size modulation and spot merging as employed in laser printer resolution enhancement are not required for this. Correcting only for near vertical features also reduces the number of templates required by roughly half. Also, when printing text, near vertical conditions occur more often than near horizontal, such as in italic printing, and the print quality defects of near vertical features in text tend to be more apparent to the observer.

In order to produce image enhancement as described, the bit image data created has a vertical resolution of 300 dpi and a horizontal resolution of 600 dpi. The resultant bit map, if handled prior to printing, would require twice the storage and processor bandwidth as the original data. It is therefore a further objective of the invention to provide a print quality enhancement method and apparatus which eliminates the need for such extra hardware and software to handle this larger data set.

In accordance with one aspect of the invention, this need for extra hardware and software is eliminated by creating and considering only a limited number of the high resolution data pels at a time. In the illustrated form of the invention, the number of pels of high resolution data processed to eliminate unprintable dots is six. Using a traveling six pel window, together with two other control inputs, the system can intelligently modify the data such that it is printable by a lower resolution device.

For example, the maximum fire rate of the print nozzles combined with the target speed of the print head carrier allows consecutive dots to be placed a minimum of 0.0033 inches apart on one type of printer embodying the invention. This results in a maximum printable horizontal resolution of 300 dpi. The encoding scheme on the printer allows for 600 dpi addressability. In other words, the printer is capable of placing the pels on a 600 dpi grid. The above-mentioned limitations of the print head speed and nozzle firing rate imply that no two consecutive 600 dpi pels can be printed. Since the enhanced print data has a horizontal resolution of 600 dots per inch, some of the dots must be eliminated before the data is sent to the print head.

A simple combination of each pair of dots from the data stream, while satisfying the firing criteria for the print head, will defeat the purpose of the original print enhancement. When print enhancement produces odd strings of 600 dpi pels, an exact representation of the 600 dpi image is not possible. An intelligent algorithm for synthesizing the data can both satisfy the print head requirements and maintain the improved edge definition obtained through the print enhancement. An aspect of the invention, when implemented in the printer hardware, will process the enhanced data "on the fly" while remaining transparent to the printer software.

BRIEF DESCRIPTION OF THE DRAWINGS

FIG. 1A and FIG. 1B are illustrations of dot placement before and after vertical smoothing in a prior art laser printer;

FIG. 2A and FIG. 2B are illustrations of dot placement before and after horizontal smoothing in a prior art laser printer;

FIG. 5 is a block diagram of the print quality enhancement apparatus of the present invention;

DETAILED DESCRIPTION

As indicated earlier, the presently disclosed invention relates only to resolution improvement along one axis, in this case the horizontal axis. The resolution on the vertical axis is fixed at some value determined by the vertical spacing of the ink nozzles on the print head. For the embodiment described herein, that resolution is 300 dpi vertical and should be assumed when horizontal resolution specifications are discussed even though the invention is not limited to this vertical resolution. The following references to resolution (such as 300 dpi) generally refer to resolution along the horizontal axis.

If the maximum frequency response of a thermal ink jet print head only allows one to place adjacent horizontal dots no closer than 3.33 mils center to center (or 300 dpi) at the maximum specified print head translational velocity, it is not immediately apparent how to place dots on a 600 dpi grid, or every 1.67 mils. This can be accomplished using a technique developed for wire dot matrix printers.

A thermal ink jet print head has a certain number of nozzles arranged in a vertical direction perpendicular to the direction of print head travel, with a certain spacing between each nozzle and a preceding or succeeding nozzle. For simplicity of the present discussion, the nozzles may be regarded as being in a single vertical line, although in actuality a plurality of generally vertical columns of nozzles are provided on an ink jet print head. With appropriate vertical nozzle spacing and the timing of firing pulses, the effect is the same as in the case of a single column of nozzles.

Any number of the nozzles may be fired at a given instant in time yielding a vertical line, or print slice. The spacing of these vertical print slices is nominally set by a nozzle's maximum operating frequency and the horizontal velocity of the print head. In the present embodiment, the maximum frequency is 5 kilohertz and the print head velocity is 16.67 inches per second. The distance between vertical print slices is therefore 16.67/5000, which equals 0.00333 inches or 300 slices per inch.

Figure 4:
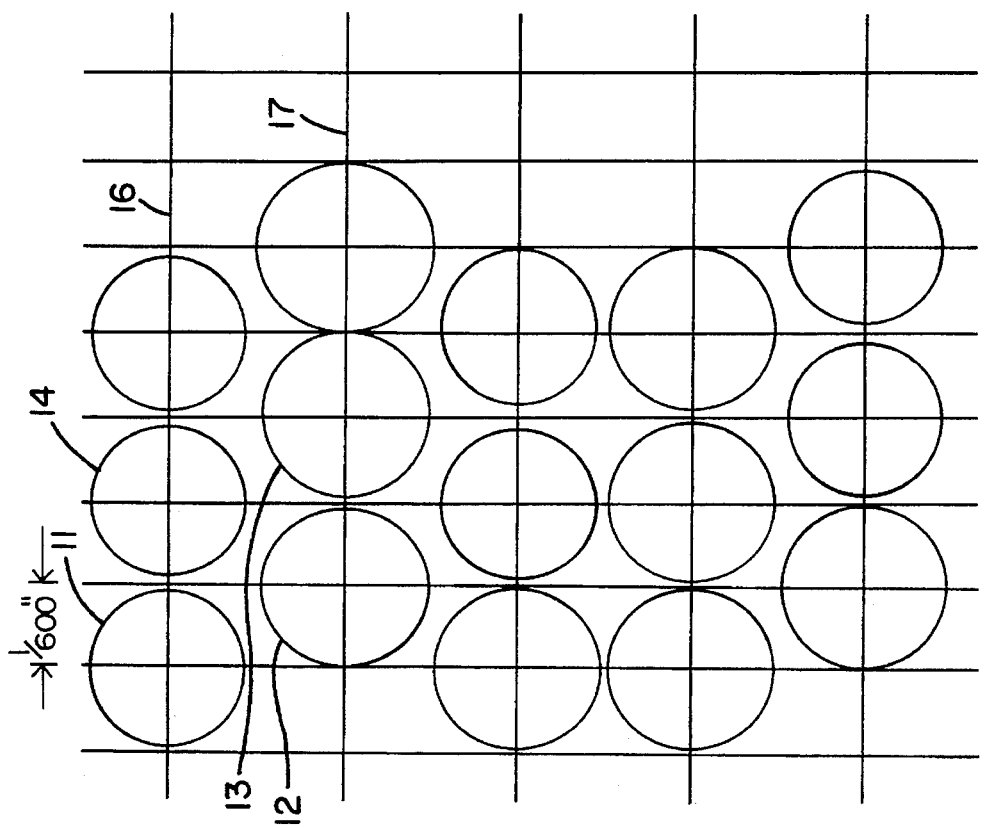
FIG. 4 is an illustration of data dots at a 300 dpi resolution arranged on a 600 dpi horizontal grid.
Figure 3:
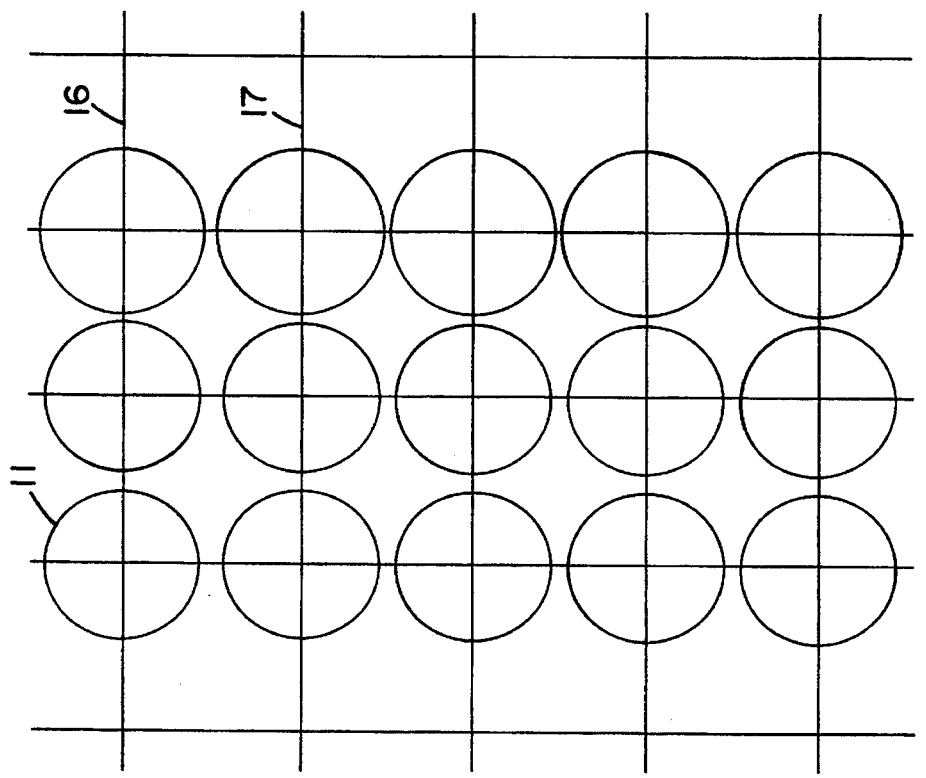
FIG. 3 is an illustration of data dots arranged on a 300 dpi grid.

With reference now to FIG. 3, wherein dots are placed on a 300 dpi grid by a print head moving from left to right, all horizontally adjacent dots are at least 3.33 mils apart and therefore do not violate the print head nozzle performance criteria. When, for example, the first nozzle prints a dot 11 along nozzle path 16, it cannot print another dot until the print head advances at least 3.33 mils because of the maximum frequency response limitation of the print head. However, if nozzle 2 (moving along nozzle path 17) did not print a dot when nozzle 1 did, it could place a dot 1.67 mils after nozzle 1 had printed. This situation is illustrated in FIG. 4.

In this case, the dots such as 12 and 13 printed by nozzle 2 are offset from dots such as 11 and 14 printed by nozzle 1 by 1.67 mils along the horizontal axis, even though horizontally adjacent dots printed by nozzle 2 are still 3.33 mils apart and not in violation of the nozzle's maximum frequency of operation. Taken as a whole, there is a 600 dpi horizontal grid on which dots may be placed as long as no two adjacent horizontal dots printed by the same nozzle are within less than 3.33 mils of one another. In this way a pseudo 600 dpi horizontal print resolution capability is achieved. This is not true 600 dpi resolution because not every print position on the 600 dpi grid can have a printed dot, only half of the print positions could. Some printers on the market today store their bit-mapped fonts in this pseudo 600 dpi horizontal format. However, this requires twice the memory that storing standard 300 dpi fonts requires (if no compression is used) and since 300 dpi is an industry standard, there is a much larger variety of fonts presently available in the 300 dpi format.

In the present instance, conversion from a 300 dpi grid to a 600 dpi grid is described and illustrated. The inventive method and apparatus take data stored on a lower resolution grid format that is limited by the print head's performance and automatically shifts the data from that format into a finer resolution grid in a manner that improves perceived print quality but does not performance requirements of the thermal print head. In the manner in which this is performed, there is not the expense of providing memory for storing fonts in a pseudo 600 dpi format, and the benefits of the present invention are obtained even for bit mapped graphics received in the lower resolution format.

With reference now to FIG. 5, which is a block diagram of the print data flow and the apparatus that performs the conversion of 300 dpi format data to pseudo 600 dpi data for printing, print data that is in the 300 dpi format is stored in an area of the printer's main memory 21 known as the swath buffer 22. The swath buffer 22 is generally low speed, low cost memory and the print quality enhancement hardware 23 pulls out of this memory a block of data that is 64 dots high vertically and 5 dots wide horizontally and stores it in a memory array 24 that is part of the print quality enhancement hardware 23. The print quality enhancement hardware 23 scans this data and compares it with a set of templates stored in template memory 26. The compare circuitry 27 receives the 300 by 300 dpi data from the buffer 24 and compares it with template data supplied from the template memory 26. The template data comprises prestored arrangements of dots that match some typical feature that is printed on a 300 dpi grid. Each template has associated with it a correction that is applied to the scanned data that it matches which will shift some of the dots from their original position on a 300 dpi grid into a 600 dpi grid to smooth the feature. After the compare circuitry 27 of the print quality enhancement hardware 23 compares the 300 by 300 dpi data to the template data, the portion 28 manipulates the dots of the 300 dpi data to create a 600 dpi grid based on the template information. This 300 by 600 dpi data is then modified by a portion 29 of the print quality enhancement hardware 23 to eliminate violations on the frequency of operation of the individual nozzles. Three hundred by a pseudo 600 dpi data leaves the print quality enhancement hardware 23 to be received by the print engine controller 31 for driving the ink jet print head 32 to place drops of ink onto paper.

Figure 6:
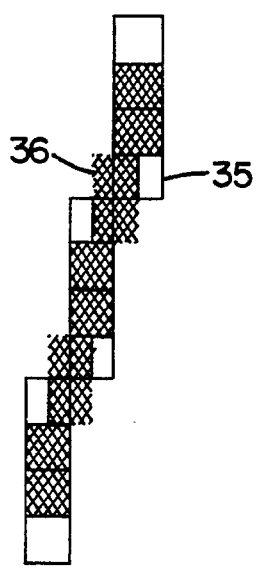
FIG. 6 is an illustration of vertical edge smoothing in accordance with the present invention.

FIG. 6 shows an exemplary 12 print element segment of 300 dpi data such as 35 converted to 600 dpi data, with the shaded boxes such as 36 showing the resulting shift of dots to a 600 dpi grid after being passed through the template comparison step and the resultant smoothed feature. The outlined boxes such as 35 show the original dot locations that were on the 300 dpi grid.

After correction by the correction section 29 of the print quality enhancement circuitry 23, dots placed on the 600 dpi grid which violate the requirement that no two adjacent horizontal dots be less than 3.33 mils apart are shifted or removed from the pseudo 600 dpi grid. All of the dot correction is done as the printer is moving the print head and printing, which preferably results in the use of high speed hardware.

In accomplishing dot shifting in the sections 27 and 28 of the print quality enhancement hardware 23, the block of print data stored in the 64 by 5 memory array is scanned, with analysis occurring for each pel and its surrounding 9 by 5 array of pels.

Figure 7:
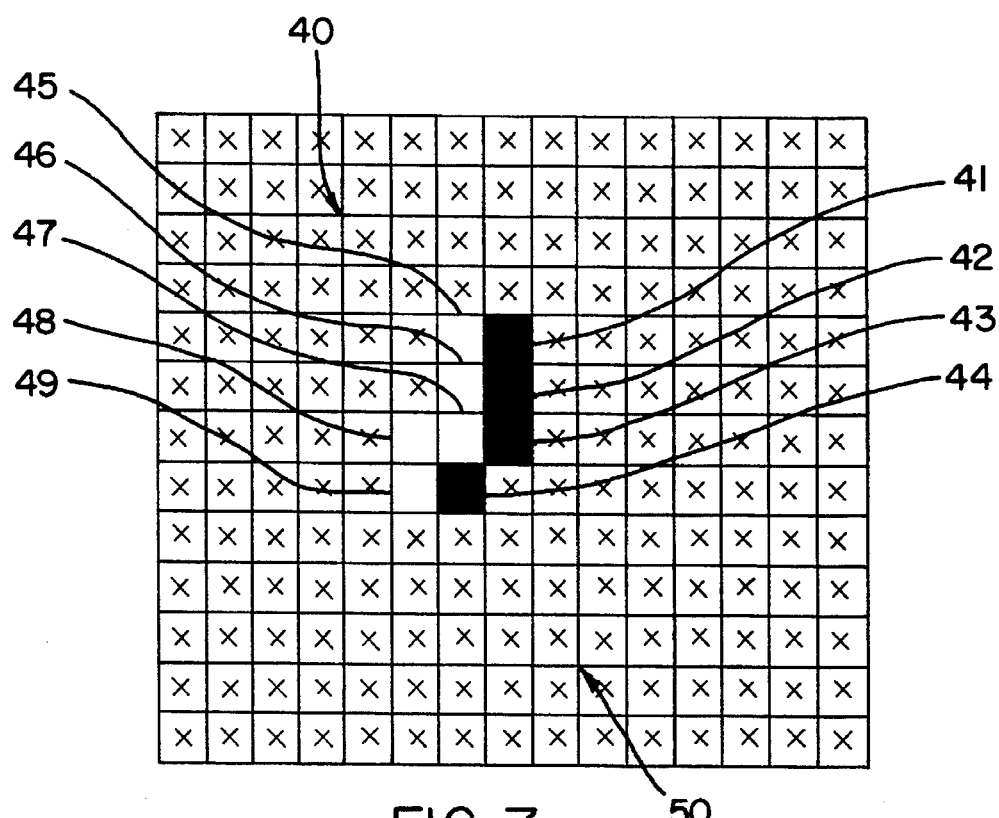
FIG. 7 is an illustration of resolution enhancement in the horizontal direction.

For example, and with reference to FIG. 7, a black/white boundary feature in a 300 dpi grid that is to be enhanced is made up of four black pels 41, 42, 43 and 44 and five white pels 45, 46, 47, 48 and 49. The pel under investigation is the pel 47, which is at the center of a notional rectangular 9 pel (vertical) by 5 pel (horizontal) box. The upper left corner of this box is indicated as 40, and the lower right corner of this box is indicated as 50. If a pel is indicated as white, there is no dot at this location in the original 300 dpi data, and if a pel is black, that means that a dot is to be placed in that location in the original data. If a box contains an X that indicates that the pel has no influence on the decision concerning the 300 dpi pel 47. In the present example, the template directs the creation of an "01" of 600 dpi data for the 300 dpi pel 47.

These modifications would result in the print engine firing a particular nozzle 1/600 of an inch earlier than would have been the case with the original 300 dpi data. A similar analysis is done for every pel, and each one is either shifted to the left or the right by 1/600 of an inch or left in place.

The correction of the 600 dpi data produced by moving dots to a 600 dpi grid is accomplished in the portion 29 of the print quality enhancement hardware 23.

In this process, 600 dpi data is modified as it is being sent to the print head so that it will be printable by a 300 dpi machine. The effect of this process is to combine adjacent 600 dpi dots to produce the equivalent 300 dpi pel located on a 600 dpi grid. Some exceptions will occur in which some of the 600 dpi data will not be entirely represented on the page. These situations are dealt with while attempting to maintain the print quality as a top priority.

The inputs to the correction section 29 of the print quality enhancement hardware 23 include a section of the enhanced print data, the location of the dot most recently printed, and the original data presented in the 300 dpi image, prior to enhancement, which corresponds to the current dot to be printed. Using these inputs, the correction circuitry 29 locates each 300 dpi pel on the 600 dpi grid.

Figure 8:
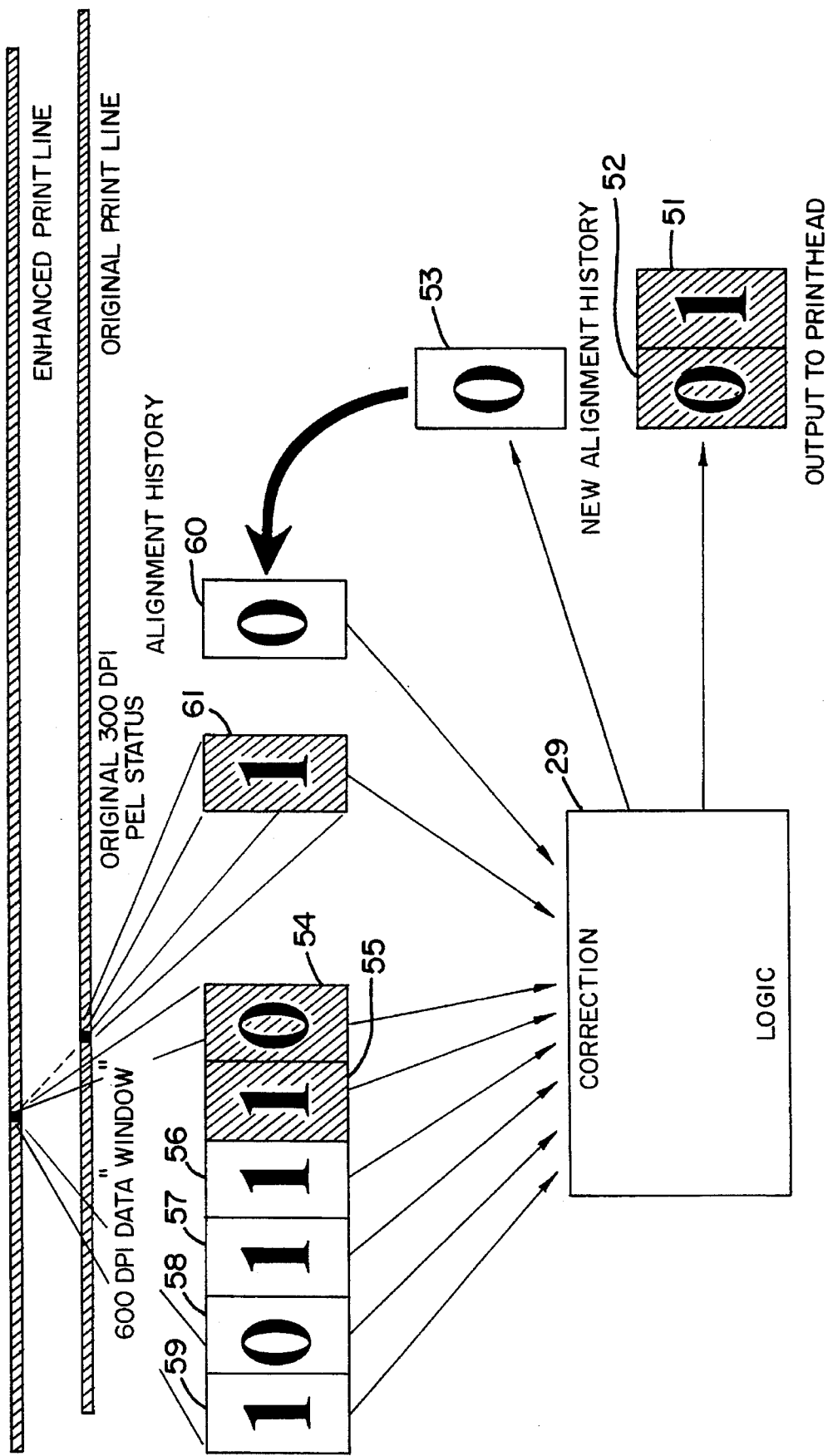
FIG. 8 is an illustration of the logic sequence in processing higher resolution data to eliminate unprintable dots.

Referring now to FIG. 8, the correction logic portion 29 of the print quality enhancement hardware produces three bits of output from eight bits of input for each nozzle. The outputs are two bits representing 600 dpi pels 51 and 52 and one bit 53 which maintains the alignment history. In the figure, the shaded regions indicate the print location currently being evaluated. The correction logic has two choices, within each 300 dpi space, for pel placement. The print head will be directed to place a drop of ink on the 600 dpi grid according to which of the 600 dpi pels is on. The value of the history bit 53 is updated to reflect the new alignment.

The inputs to the correction logic are two bits 54 and 55 representing the current two bits of 600 dpi data at the current print location, four bits 56–59 representing the next four 600 dpi print locations, the previous value 60 of the history bit, and one bit 61 which represents the state of the 300 dpi pel in the original image which corresponds to the current print location being evaluated.

The six bits 54–59 representing the 600 dpi pels which are input to the correction logic 29 give the correction logic a window in the current print line. The history bit indicates the current alignment on the 600 dpi grid. That is, the history bit 60 is representative of the status (delayed or non-delayed) of the previous firing point of a 300 dpi dot on the 600 dpi grid. The original data bit 61 is used specifically in the case of three consecutive 600 dpi pels. This case differs from any other odd string of dots and must be considered separately. In essence, where it is uncertain whether or not to print a pel in a given location, the original data is consulted to make the determination. Using the eight bits 54–61 of information, the correction logic 29 can sequentially handle a string of data up to an entire line in width to effect correction for a nozzle on-the-fly during printing. In the case of a 50 nozzle (spaced from one another vertically) system, the logic handles 50 parallel strings of data for a print head pass.

The print head is only capable of exactly duplicating two or four 600 dpi dots. In the case of three 600 dpi pels, the correction logic will generate one or two 300 dpi dots dependent upon the 300 dpi image data prior to enhancement, as indicated by the bit 61. If the original image contained two 300 dpi pels and the enhancement resulted in a string of three 600 dpi pels, the correction logic would override the enhancement and effect the printing of both pels.

Figure 9A:
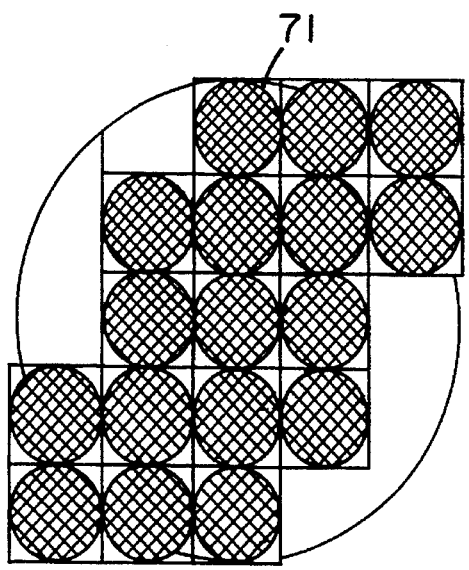
FIGS. 9A, 9B, and 9C illustrate exemplary original 300 dpi image data, image enhanced to 600 dpi horizontal resolution and the actual 300 dpi output from the print quality enhancement apparatus, respectively.
Figure 9B:
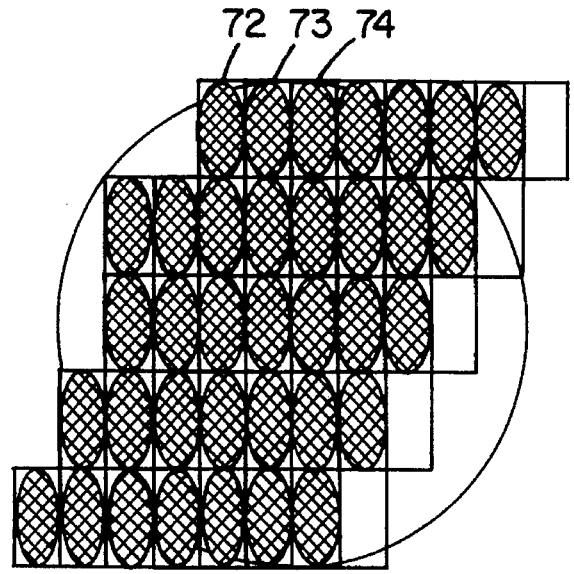
Figure 9C:
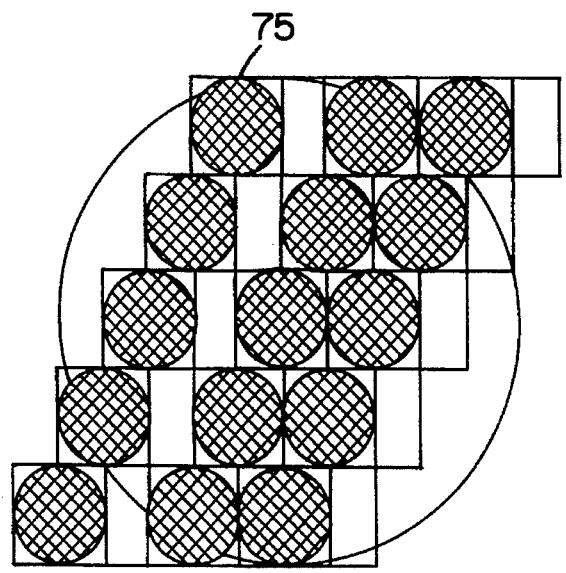

With reference to FIG. 9, if the original image (FIG. 9A) contained, for example, a first row of 300 dpi data including a pel such as 71 at a given location, the template image enhancement might yield a series of 600 dpi pels as shown in FIG. 9B. In the first line, for example, three 300 dpi pels are converted to seven 600 dpi pels by the image enhancement. There are two 600 dpi pels 73 and 74 in the location of the 300 dpi pel 71, while an additional 600 dpi pel has been added as shown at 72.

The correction logic overrides the enhancement of the exemplary first row of pels to produce a single 300 dpi pel 75 located at the grid position occupied by the two 600 dpi pels 72 and 73. This result occurs in the case of printing from right to left, as viewed in FIG. 9C, with the effect being that one 300 dpi pel is printed at a location 1/600 of an inch to the left of the location of the pel 71 in the original data. This result, in the first line and in the lower lines, provides edge smoothing.

The above process occurs for any 2n+1 consecutive 600 dpi pels, where n is a positive integer. The correction logic is organized such that the original image is best preserved and the corruption of the image enhancement is kept to a minimum. In situations with even numbers of consecutive 600 dpi pels, the correction logic will always be able to generate the equivalent 300 dpi image using the correct 600 dpi registration.

Figure 10A:
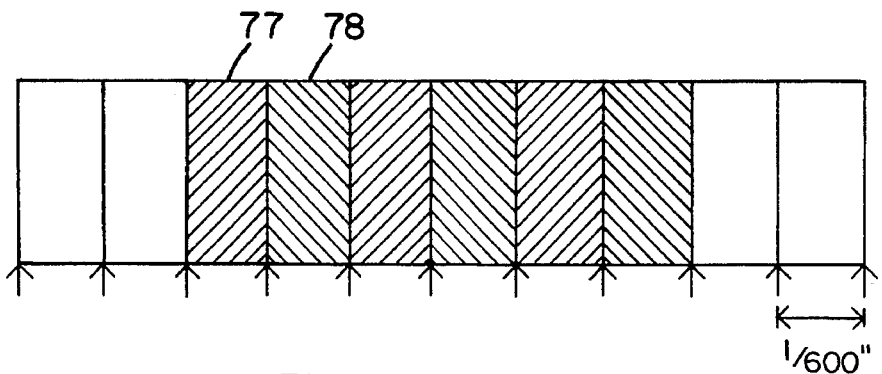
FIGS. 10A and 10B show the placement of 300 dpi dots to represent 600 dpi enhanced print data.
Figure 10B:
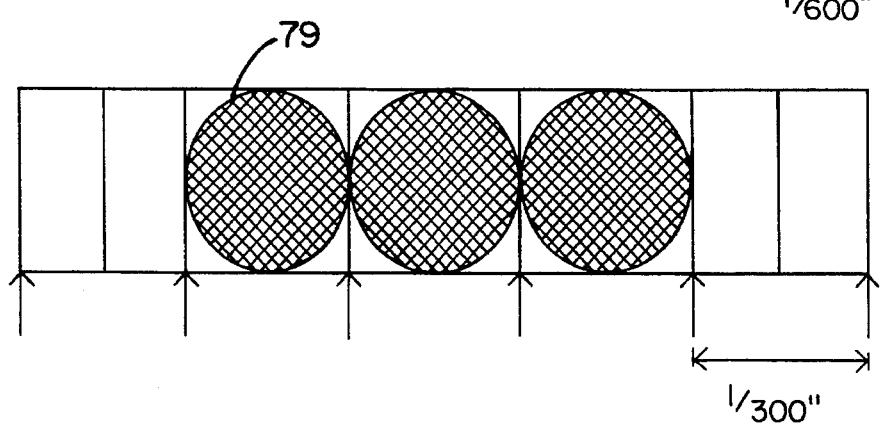

With reference to FIG. 10, a set of exemplary enhanced data for a given print element consists of six consecutive 600 dpi pels such as 77 and 78 (FIG. 10A) which are to be printed. The correction logic combines these six "dots" to form three 300 dpi dots such as 79 for printing. This modification is straightforward and will yield an exact representation of the 600 dpi image on the page. The 300 dpi dots may be aligned on the boundaries of the 300 dpi grid or shifted by 1/600 inch dependent upon the location of the "dots" of FIG. 10A relative to the 300 pel grid.

Figure 11A:
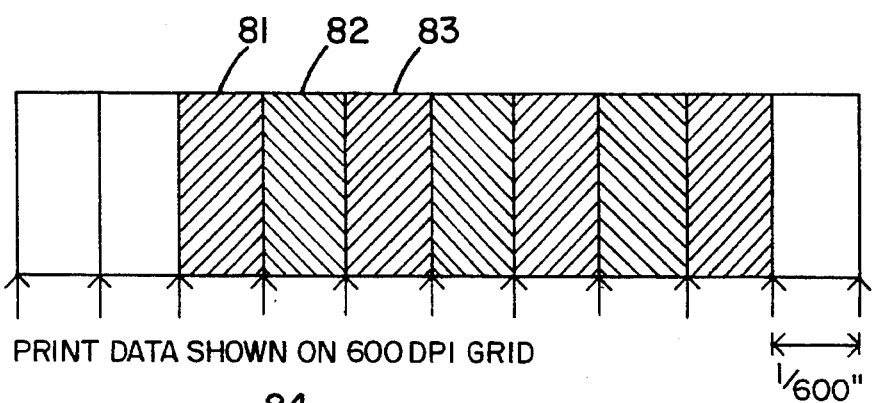
FIGS. 11A and 11B illustrate a situation similar to that of FIGS. 10A and 10B for an odd number of 600 dpi data points.
Figure 11B:
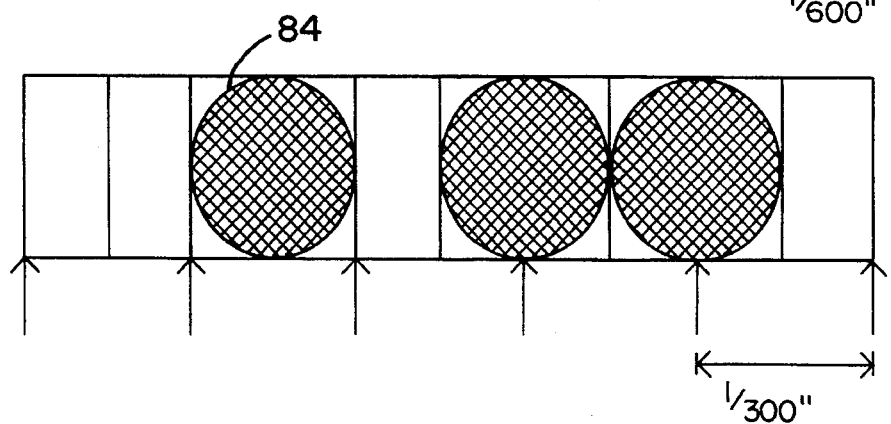

Referring now to FIG. 11, the 600 dpi data of FIG. 11A contains seven adjacent pels, including pels 81, 82 and 83, to be printed. The correction logic must make a decision at this point on how to best represent the original image since only an even number of 600 dpi pels can be printed. The decision is based on the premise that a smooth edge at a black-to-white transition is desirable. The corresponding output illustrated in FIG. 11B shows the result of this decision including the 300 dpi dot 84. The shift of the dot 84 to the left maintains a smooth edge on a near vertical line or character.

The 256 possible input combinations of the eight bits coupled to the control logic were studied individually to determine the appropriate data output. The table of inputs and their resulting outputs are implemented in the illustrated hardware. The correction logic operates on the datastream as it is being fed to the print head, therefore calling for no additional system memory or preprocessing of the data.

The correction logic outputs for various inputs are as shown in the following listing, in which X=don't care, H=alignment history, H'=new alignment history, O=original 300 dpi pel status, 1=two bits of 600 dpi data currently being considered, and 2 and 3 are the next two pairs of bits of 600 dpi data.

| INPUTS | | | | | OUTPUTS | | | |
|---|---|---|---|---|---|---|---|---|
| 3 | 2 | 1 | H | O | 1' | H' | CAN'T HAPPEN | |
| 0 0 | 0 0 | 0 0 | 0 | 0 | 0 0 | 0 | | |
| 0 0 | 0 0 | 0 0 | 0 | 1 | 0 0 | 0 | | |
| 0 0 | 0 0 | 0 0 | 1 | 0 | 0 0 | 0 | | |
| 0 0 | 0 0 | 0 0 | 1 | 1 | 0 0 | 0 | | |
| 0 0 | 0 0 | 0 1 | 0 | 0 | 0 1 | 0 | | |
| 0 0 | 0 0 | 0 1 | 0 | 1 | 0 0 | 0 | | |
| 0 0 | 0 0 | 0 1 | 1 | 0 | 0 0 | 0 | | |
| 0 0 | 0 0 | 0 1 | 1 | 1 | 0 0 | 0 | | |
| 0 0 | 0 0 | 1 0 | 0 | 0 | 0 0 | 0 | * | |
| 0 0 | 0 0 | 1 0 | 0 | 1 | 1 0 | 0 | | |
| 0 0 | 0 0 | 1 0 | 1 | 0 | 0 0 | 0 | * | |
| 0 0 | 0 0 | 1 0 | 1 | 1 | 1 0 | 0 | | |
| 0 0 | 0 0 | 1 1 | 0 | 0 | 0 1 | 0 | * | |
| 0 0 | 0 0 | 1 1 | 0 | 1 | 1 0 | 1 | 0 | |
| 0 0 | 0 0 | 1 1 | 1 | 0 | 1 0 | 0 | * | |
| 0 0 | 0 0 | 1 1 | 1 | 1 | 1 0 | 0 | * | |
| 0 0 | 0 1 | 0 0 | 0 | 0 | 0 0 | 0 | | |
| 0 0 | 0 1 | 0 0 | 0 | 1 | 0 0 | 0 | * | |
| 0 0 | 0 1 | 0 0 | 1 | 0 | 0 0 | 0 | * | |
| 0 0 | 0 1 | 0 0 | 1 | 1 | 0 0 | 0 | * | |
| 0 0 | 0 1 | 0 1 | 0 | 0 | 0 0 | 0 | | |
| 0 0 | 0 1 | 0 1 | 0 | 1 | 0 1 | 0 | | |
| 0 0 | 0 1 | 0 1 | 1 | 0 | 0 0 | 0 | | |
| 0 0 | 0 1 | 0 1 | 1 | 1 | 0 0 | 0 | | |
| 0 0 | 0 1 | 1 0 | 0 | 0 | 1 0 | 1 | * | |
| 0 0 | 0 1 | 1 0 | 0 | 1 | 1 0 | 1 | * | |
| 0 0 | 0 1 | 1 0 | 1 | 0 | 1 0 | 1 | | |
| 0 0 | 0 1 | 1 0 | 1 | 1 | 1 0 | 1 | | |
| 0 0 | 0 1 | 1 1 | 0 | 0 | 0 1 | 0 | * | |
| 0 0 | 0 1 | 1 1 | 0 | 1 | 0 1 | 0 | | |
| 0 0 | 0 1 | 1 1 | 1 | 0 | 0 0 | 1 | * | |
| 0 0 | 0 1 | 1 1 | 1 | 1 | 0 0 | 1 | | |
| 0 0 | 1 0 | 0 0 | 0 | 0 | 0 0 | X | | |
| 0 0 | 1 0 | 0 0 | 0 | 1 | 0 0 | X | | |
| 0 0 | 1 0 | 0 0 | 1 | 0 | 0 0 | X | | |
| 0 0 | 1 0 | 0 0 | 1 | 1 | 0 0 | X | | |
| 0 0 | 1 0 | 0 1 | 0 | 0 | 0 0 | X | | |
| 0 0 | 1 0 | 0 1 | 0 | 1 | 0 1 | X | | |
| 0 0 | 1 0 | 0 1 | 1 | 0 | 0 0 | X | | |
| 0 0 | 1 0 | 0 1 | 1 | 1 | 0 0 | X | | |
| 0 0 | 1 0 | 1 0 | 0 | 0 | 0 0 | X | * | |
| 0 0 | 1 0 | 1 0 | 0 | 1 | 1 0 | X | * | |
| 0 0 | 1 0 | 1 0 | 1 | 0 | 0 0 | X | * | |
| 0 0 | 1 0 | 1 0 | 1 | 1 | 1 0 | X | * | |
| 0 0 | 1 0 | 1 1 | 0 | 0 | 0 1 | X | * | |
| 0 0 | 1 0 | 1 1 | 0 | 1 | 0 1 | X | | |
| 0 0 | 1 0 | 1 1 | 1 | 0 | 1 0 | X | * | |
| 0 0 | 1 0 | 1 1 | 1 | 1 | 1 0 | X | | |
| 0 0 | 1 1 | 0 0 | 0 | 0 | 0 0 | 0 | | |
| 0 0 | 1 1 | 0 0 | 0 | 1 | 0 0 | 0 | * | |
| 0 0 | 1 1 | 0 0 | 1 | 0 | 0 0 | 0 | | |
| 0 0 | 1 1 | 0 0 | 1 | 1 | 0 0 | 0 | * | |
| 0 0 | 1 1 | 0 1 | 0 | 0 | 0 0 | 0 | | |
| 0 0 | 1 1 | 0 1 | 0 | 1 | 0 1 | 0 | | |
| 0 0 | 1 1 | 0 1 | 1 | 0 | 0 0 | 0 | | |
| 0 0 | 1 1 | 0 1 | 1 | 1 | 0 0 | 0 | | |
| 0 0 | 1 1 | 1 0 | 0 | 0 | 0 0 | 1 | * | |
| 0 0 | 1 1 | 1 0 | 0 | 1 | 1 0 | 1 | * | |
| 0 0 | 1 1 | 1 0 | 1 | 0 | 0 0 | 0 | | |
| 0 0 | 1 1 | 1 0 | 1 | 1 | 1 0 | 0 | | |
| 0 0 | 1 1 | 1 1 | 0 | 0 | 0 1 | 0 | * | |
| 0 0 | 1 1 | 1 1 | 0 | 1 | 0 1 | 0 | | |
| 0 0 | 1 1 | 1 1 | 1 | 0 | 0 0 | 0 | * | |
| 0 0 | 1 1 | 1 1 | 1 | 1 | 0 0 | 0 | | |
| 0 1 | 0 0 | 0 0 | 0 | 0 | 0 0 | 0 | | |
| 0 1 | 0 0 | 0 0 | 0 | 1 | 0 0 | 0 | * | |
| 0 1 | 0 0 | 0 0 | 1 | 0 | 0 0 | 0 | | |
| 0 1 | 0 0 | 0 0 | 1 | 1 | 0 0 | 0 | * | |
| 0 1 | 0 0 | 0 1 | 0 | 0 | 0 0 | 0 | | |
| 0 1 | 0 0 | 0 1 | 0 | 1 | 0 1 | 0 | | |
| 0 1 | 0 0 | 0 1 | 1 | 0 | 0 0 | 0 | | |
| 0 1 | 0 0 | 0 1 | 1 | 1 | 0 0 | 0 | | |

-continued

| 3 | 2 | 1 | H | O | | 1' | | H' | CAN'T HAPPEN | |
|---|---|---|---|---|---|---|---|---|---|---|
| 0 | 1 | 0 | 0 | 1 | 0 | 0 | 0 | 0 | 0 | * |
| 0 | 1 | 0 | 0 | 1 | 0 | 1 | 1 | 0 | 0 | |
| 0 | 1 | 0 | 0 | 1 | 0 | 1 | 0 | 0 | 0 | |
| 0 | 1 | 0 | 0 | 1 | 1 | 0 | 0 | 0 | 0 | |
| 0 | 1 | 0 | 0 | 1 | 1 | 1 | 1 | 0 | 0 | |
| 0 | 1 | 0 | 1 | 0 | 0 | 0 | 1 | 0 | 0 | * |
| 0 | 1 | 0 | 1 | 0 | 1 | 0 | 1 | 0 | 0 | |
| 0 | 1 | 0 | 1 | 1 | 0 | 1 | 0 | 0 | 0 | * |
| 0 | 1 | 0 | 1 | 1 | 1 | 1 | 0 | 0 | 0 | * |
| 0 | 1 | 0 | 1 | 1 | 1 | 1 | 1 | 0 | 0 | |
| 0 | 1 | 1 | 0 | 0 | 0 | 0 | 0 | 0 | 0 | |
| 0 | 1 | 1 | 0 | 0 | 1 | 0 | 0 | 0 | 0 | * |
| 0 | 1 | 1 | 0 | 0 | 1 | 0 | 0 | 0 | 0 | * |
| 0 | 1 | 1 | 0 | 0 | 1 | 1 | 0 | 0 | 0 | * |
| 0 | 1 | 1 | 0 | 1 | 0 | 0 | 0 | 0 | 0 | |
| 0 | 1 | 1 | 0 | 1 | 0 | 1 | 0 | 0 | 0 | |
| 0 | 1 | 1 | 0 | 1 | 1 | 0 | 0 | 0 | 0 | |
| 0 | 1 | 1 | 0 | 1 | 1 | 1 | 0 | 0 | 0 | |
| 0 | 1 | 1 | 1 | 0 | 0 | 0 | 1 | 0 | 0 | * |
| 0 | 1 | 1 | 1 | 0 | 0 | 0 | 1 | 0 | 0 | * |
| 0 | 1 | 1 | 1 | 0 | 1 | 0 | 1 | 0 | 0 | |
| 0 | 1 | 1 | 1 | 0 | 1 | 1 | 1 | 0 | 0 | |
| 0 | 1 | 1 | 1 | 1 | 0 | 0 | 0 | 1 | 0 | * |
| 0 | 1 | 1 | 1 | 1 | 0 | 1 | 0 | 1 | 0 | |
| 0 | 1 | 1 | 1 | 1 | 1 | 0 | 0 | 0 | 1 | * |
| 0 | 1 | 1 | 1 | 1 | 1 | 0 | 0 | 0 | 1 | |
| 0 | 1 | 1 | 0 | 0 | 0 | 0 | 0 | 0 | 1 | |
| 0 | 1 | 1 | 0 | 0 | 0 | 1 | 0 | 0 | 1 | * |
| 0 | 1 | 1 | 0 | 0 | 1 | 0 | 0 | 0 | 1 | |
| 0 | 1 | 1 | 0 | 0 | 1 | 1 | 0 | 0 | 1 | * |
| 0 | 1 | 1 | 0 | 1 | 0 | 0 | 0 | 0 | 1 | |
| 0 | 1 | 1 | 0 | 1 | 0 | 1 | 0 | 1 | 1 | |
| 0 | 1 | 1 | 0 | 1 | 1 | 0 | 0 | 0 | 1 | |
| 0 | 1 | 1 | 0 | 1 | 1 | 1 | 0 | 0 | 1 | |
| 0 | 1 | 1 | 1 | 0 | 0 | 0 | 0 | 0 | 1 | * |
| 0 | 1 | 1 | 1 | 0 | 0 | 1 | 1 | 0 | 1 | * |
| 0 | 1 | 1 | 1 | 0 | 1 | 0 | 0 | 0 | 1 | * |
| 0 | 1 | 1 | 1 | 0 | 1 | 1 | 1 | 0 | 1 | * |
| 0 | 1 | 1 | 1 | 1 | 0 | 0 | 1 | 1 | 1 | |
| 0 | 1 | 1 | 1 | 1 | 0 | 1 | 0 | 1 | 1 | |
| 0 | 1 | 1 | 1 | 1 | 1 | 0 | 1 | 0 | 1 | * |
| 0 | 1 | 1 | 1 | 1 | 1 | 1 | 0 | 0 | 1 | * |
| 0 | 1 | 1 | 0 | 0 | 0 | 0 | 0 | 0 | 0 | |
| 0 | 1 | 1 | 0 | 0 | 0 | 1 | 0 | 0 | 0 | * |
| 0 | 1 | 1 | 0 | 0 | 1 | 0 | 0 | 0 | 0 | |
| 0 | 1 | 1 | 0 | 1 | 0 | 0 | 0 | 0 | 0 | * |
| 0 | 1 | 1 | 0 | 1 | 0 | 1 | 0 | 1 | 0 | |
| 0 | 1 | 1 | 0 | 1 | 1 | 0 | 0 | 0 | 0 | |
| 0 | 1 | 1 | 0 | 1 | 1 | 1 | 0 | 0 | 0 | |
| 0 | 1 | 1 | 1 | 0 | 0 | 0 | 1 | 0 | 1 | * |
| 0 | 1 | 1 | 1 | 0 | 1 | 1 | 0 | 0 | 1 | * |
| 0 | 1 | 1 | 1 | 0 | 1 | 0 | 1 | 0 | 1 | |
| 0 | 1 | 1 | 1 | 0 | 1 | 1 | 0 | 0 | 1 | |
| 0 | 1 | 1 | 1 | 1 | 0 | 0 | 0 | 1 | 0 | * |
| 0 | 1 | 1 | 1 | 1 | 0 | 1 | 0 | 1 | 0 | |
| 0 | 1 | 1 | 1 | 1 | 1 | 0 | 1 | 0 | 1 | * |
| 0 | 1 | 1 | 1 | 1 | 1 | 1 | 1 | 0 | 1 | |
| 1 | 0 | 0 | 0 | 0 | 0 | 0 | 0 | 0 | 0 | |
| 1 | 0 | 0 | 0 | 0 | 0 | 1 | 0 | 0 | 0 | * |
| 1 | 0 | 0 | 0 | 0 | 1 | 0 | 0 | 0 | 0 | |
| 1 | 0 | 0 | 0 | 0 | 1 | 1 | 0 | 0 | 0 | * |
| 1 | 0 | 0 | 0 | 1 | 0 | 0 | 0 | 1 | 0 | |
| 1 | 0 | 0 | 0 | 1 | 0 | 1 | 0 | 0 | 0 | |
| 1 | 0 | 0 | 0 | 1 | 1 | 0 | 0 | 0 | 0 | |
| 1 | 0 | 0 | 1 | 0 | 0 | 0 | 0 | 0 | 0 | * |
| 1 | 0 | 0 | 1 | 0 | 0 | 1 | 1 | 0 | 0 | |
| 1 | 0 | 0 | 1 | 0 | 1 | 0 | 0 | 0 | 0 | * |
| 1 | 0 | 0 | 1 | 0 | 1 | 1 | 0 | 0 | 0 | * |
| 1 | 0 | 0 | 1 | 1 | 0 | 0 | 0 | 1 | 0 | * |
| 1 | 0 | 0 | 1 | 1 | 1 | 1 | 0 | 0 | 0 | * |
| 1 | 0 | 0 | 0 | 1 | 1 | 0 | 0 | 0 | 0 | |
| 1 | 0 | 0 | 1 | 0 | 0 | 0 | 0 | 0 | 0 | |
| 1 | 0 | 0 | 1 | 0 | 0 | 1 | 0 | 0 | 0 | * |
| 1 | 0 | 0 | 0 | 1 | 1 | 0 | 1 | 0 | 0 | * |
| 1 | 0 | 0 | 1 | 0 | 1 | 0 | 1 | 0 | 0 | * |
| 1 | 0 | 0 | 1 | 0 | 1 | 1 | 0 | 0 | 0 | |
| 1 | 0 | 0 | 1 | 1 | 1 | 0 | 0 | 0 | 0 | |
| 1 | 0 | 0 | 1 | 1 | 1 | 1 | 0 | 0 | 1 | |
| 1 | 0 | 1 | 0 | 0 | 0 | 0 | 0 | 0 | X | |
| 1 | 0 | 1 | 0 | 0 | 0 | 1 | 0 | 0 | X | |
| 1 | 0 | 1 | 0 | 0 | 1 | 0 | 0 | 0 | X | |
| 1 | 0 | 1 | 0 | 0 | 1 | 1 | 0 | 0 | X | |
| 1 | 0 | 1 | 0 | 0 | 1 | 0 | 0 | 0 | X | * |
| 1 | 0 | 1 | 0 | 0 | 1 | 0 | 1 | 0 | X | |
| 1 | 0 | 1 | 0 | 1 | 1 | 0 | 0 | 0 | X | * |
| 1 | 0 | 1 | 0 | 1 | 1 | 0 | 0 | 0 | X | |
| 1 | 0 | 1 | 0 | 0 | 0 | 0 | 0 | 0 | X | * |
| 1 | 0 | 1 | 0 | 0 | 1 | 1 | 0 | 0 | X | * |
| 1 | 0 | 1 | 0 | 1 | 0 | 0 | 0 | 0 | X | * |
| 1 | 0 | 1 | 0 | 1 | 1 | 1 | 0 | 0 | X | * |
| 1 | 0 | 1 | 1 | 0 | 0 | 0 | 1 | 0 | X | * |
| 1 | 0 | 1 | 1 | 0 | 1 | 0 | 1 | 0 | X | |
| 1 | 0 | 1 | 1 | 1 | 0 | 1 | 0 | 0 | X | * |
| 1 | 0 | 1 | 1 | 1 | 1 | 1 | 0 | 0 | X | |
| 1 | 0 | 1 | 0 | 0 | 0 | 0 | 0 | 0 | 0 | |
| 1 | 0 | 1 | 0 | 0 | 1 | 0 | 0 | 0 | 0 | * |
| 1 | 0 | 1 | 0 | 1 | 0 | 0 | 0 | 0 | 0 | |
| 1 | 0 | 1 | 0 | 1 | 1 | 0 | 0 | 0 | 0 | * |
| 1 | 0 | 1 | 0 | 1 | 0 | 0 | 0 | 0 | 0 | |
| 1 | 0 | 1 | 0 | 1 | 1 | 0 | 1 | 0 | 0 | |
| 1 | 0 | 1 | 1 | 1 | 0 | 0 | 0 | 0 | 0 | |
| 1 | 0 | 1 | 1 | 0 | 0 | 0 | 0 | 1 | 1 | * |
| 1 | 0 | 1 | 1 | 0 | 1 | 1 | 0 | 1 | 1 | * |
| 1 | 0 | 1 | 1 | 0 | 1 | 0 | 1 | 0 | 0 | |
| 1 | 0 | 1 | 1 | 1 | 0 | 0 | 1 | 0 | 0 | * |
| 1 | 0 | 1 | 1 | 1 | 1 | 0 | 1 | 0 | 0 | |
| 1 | 0 | 1 | 1 | 1 | 1 | 0 | 0 | 0 | 0 | * |
| 1 | 1 | 0 | 0 | 0 | 0 | 0 | 0 | 0 | 0 | |
| 1 | 1 | 0 | 0 | 0 | 0 | 1 | 0 | 0 | 0 | |
| 1 | 1 | 0 | 0 | 0 | 1 | 0 | 0 | 0 | 0 | |
| 1 | 1 | 0 | 0 | 0 | 1 | 1 | 0 | 0 | 0 | |
| 1 | 1 | 0 | 0 | 1 | 0 | 0 | 0 | 0 | 0 | |
| 1 | 1 | 0 | 0 | 1 | 0 | 1 | 0 | 1 | 0 | |
| 1 | 1 | 0 | 0 | 1 | 1 | 0 | 0 | 0 | 0 | |
| 1 | 1 | 0 | 1 | 0 | 0 | 0 | 0 | 0 | 0 | * |
| 1 | 1 | 0 | 1 | 0 | 0 | 1 | 1 | 0 | 0 | * |
| 1 | 1 | 0 | 1 | 0 | 1 | 0 | 0 | 0 | 0 | * |
| 1 | 1 | 0 | 1 | 0 | 1 | 1 | 1 | 0 | 0 | * |
| 1 | 1 | 0 | 1 | 1 | 0 | 0 | 1 | 0 | 0 | * |
| 1 | 1 | 0 | 1 | 1 | 1 | 1 | 1 | 0 | 0 | * |
| 1 | 1 | 0 | 0 | 0 | 0 | 0 | 0 | 0 | 0 | |
| 1 | 1 | 0 | 0 | 0 | 1 | 0 | 0 | 0 | 0 | * |
| 1 | 1 | 0 | 0 | 0 | 1 | 0 | 0 | 0 | 0 | * |
| 1 | 1 | 0 | 0 | 1 | 0 | 0 | 0 | 0 | 0 | |
| 1 | 1 | 0 | 0 | 1 | 1 | 0 | 0 | 0 | 0 | |
| 1 | 1 | 0 | 1 | 0 | 0 | 0 | 1 | 0 | 0 | |

-continued

| \| \| \| 3 | 2 | 1 | H | 0 | 1' | H' | CAN'T HAPPEN |
|---|---|---|---|---|---|---|---|
| INPUTS | | | | OUTPUTS | | | |
| 1 1 0 | 1 0 | 1 | 1 | 0 | 0 0 | 0 | |
| 1 1 0 | 1 0 | 1 | 1 | 1 | 0 0 | 0 | |
| 1 1 0 | 1 1 | 0 | 0 | 0 | 1 0 | 1 | * |
| 1 1 0 | 1 1 | 0 | 0 | 1 | 1 0 | 1 | * |
| 1 1 0 | 1 1 | 0 | 1 | 0 | 1 0 | 1 | |
| 1 1 0 | 1 1 | 0 | 1 | 1 | 1 0 | 1 | * |
| 1 1 0 | 1 1 | 1 | 0 | 0 | 0 1 | 0 | |
| 1 1 0 | 1 1 | 1 | 0 | 1 | 0 1 | 0 | |
| 1 1 0 | 1 1 | 1 | 1 | 0 | 0 0 | 1 | * |
| 1 1 0 | 1 1 | 1 | 1 | 1 | 0 0 | 1 | |
| 1 1 1 | 0 0 | 0 | 0 | 0 | 0 0 | 1 | |
| 1 1 1 | 0 0 | 0 | 0 | 1 | 0 0 | 1 | * |
| 1 1 1 | 0 0 | 0 | 1 | 0 | 0 0 | 1 | |
| 1 1 1 | 0 0 | 0 | 1 | 1 | 0 0 | 1 | * |
| 1 1 1 | 0 0 | 1 | 0 | 0 | 0 0 | 1 | |
| 1 1 1 | 0 0 | 1 | 0 | 1 | 0 1 | 1 | |
| 1 1 1 | 0 0 | 1 | 1 | 0 | 0 0 | 1 | |
| 1 1 1 | 0 0 | 1 | 1 | 1 | 0 0 | 1 | |
| 1 1 1 | 0 1 | 0 | 0 | 0 | 0 0 | 1 | * |
| 1 1 1 | 0 1 | 0 | 0 | 1 | 0 1 | 1 | * |
| 1 1 1 | 0 1 | 0 | 1 | 0 | 0 0 | 1 | * |
| 1 1 1 | 0 1 | 0 | 1 | 1 | 0 1 | 1 | * |
| 1 1 1 | 0 1 | 1 | 0 | 0 | 0 1 | 0 | * |
| 1 1 1 | 0 1 | 1 | 0 | 1 | 0 1 | 0 | |
| 1 1 1 | 0 1 | 1 | 1 | 0 | 1 0 | 0 | * |
| 1 1 1 | 0 1 | 1 | 1 | 1 | 1 0 | 0 | * |
| 1 1 1 | 1 0 | 0 | 0 | 0 | 0 0 | 0 | |
| 1 1 1 | 1 0 | 0 | 0 | 1 | 0 0 | 0 | * |
| 1 1 1 | 1 0 | 0 | 1 | 0 | 0 0 | 0 | * |
| 1 1 1 | 1 0 | 0 | 1 | 1 | 0 0 | 0 | * |
| 1 1 1 | 1 0 | 1 | 0 | 0 | 0 0 | 0 | |
| 1 1 1 | 1 0 | 1 | 0 | 1 | 0 1 | 0 | |
| 1 1 1 | 1 0 | 1 | 1 | 0 | 0 0 | 0 | |
| 1 1 1 | 1 0 | 1 | 1 | 1 | 0 0 | 0 | |
| 1 1 1 | 1 1 | 0 | 0 | 0 | 1 0 | 1 | * |
| 1 1 1 | 1 1 | 0 | 0 | 1 | 1 0 | 1 | * |
| 1 1 1 | 1 1 | 0 | 1 | 0 | 1 0 | 1 | |
| 1 1 1 | 1 1 | 0 | 1 | 1 | 1 0 | 1 | |
| 1 1 1 | 1 1 | 1 | 0 | 0 | 0 1 | H | * |
| 1 1 1 | 1 1 | 1 | 0 | 1 | 0 1 | H | |
| 1 1 1 | 1 1 | 1 | 1 | 0 | 1 0 | H | * |
| 1 1 1 | 1 1 | 1 | 1 | 1 | 1 0 | H | |

Returning to FIG. 5, and considering the high speed buffer portion 24 of the print quality enhancement hardware 23 in more detail, the data read into the buffer is 64 bits "high". The 64 bit high data is moved by direct memory access from the printer memory to the buffer 24, to decrease the workload on the printer microprocessor.

The exemplary present serial ink jet printer has 56 nozzles, and direct memory access would normally be accomplished using four moves of 16 bit data. This bit data movement includes 56 data bits for the print driver for the 56 nozzles and eight unused bits. In the present instance, these eight bits are used to encode information from the previous print line and the next print line so that the print enhancement algorithm performed in the portion 27 of the print quality enhancement hardware has knowledge of previous and future print lines. In particular, four bits of information from the previous line and four bits of information from the next line can be placed in the eight unused bits by the printer controller, allowing the hardware portion 27 which implements the print enhancement technique to have access to this data as it performs the algorithm on the current print line.

Figure 12:
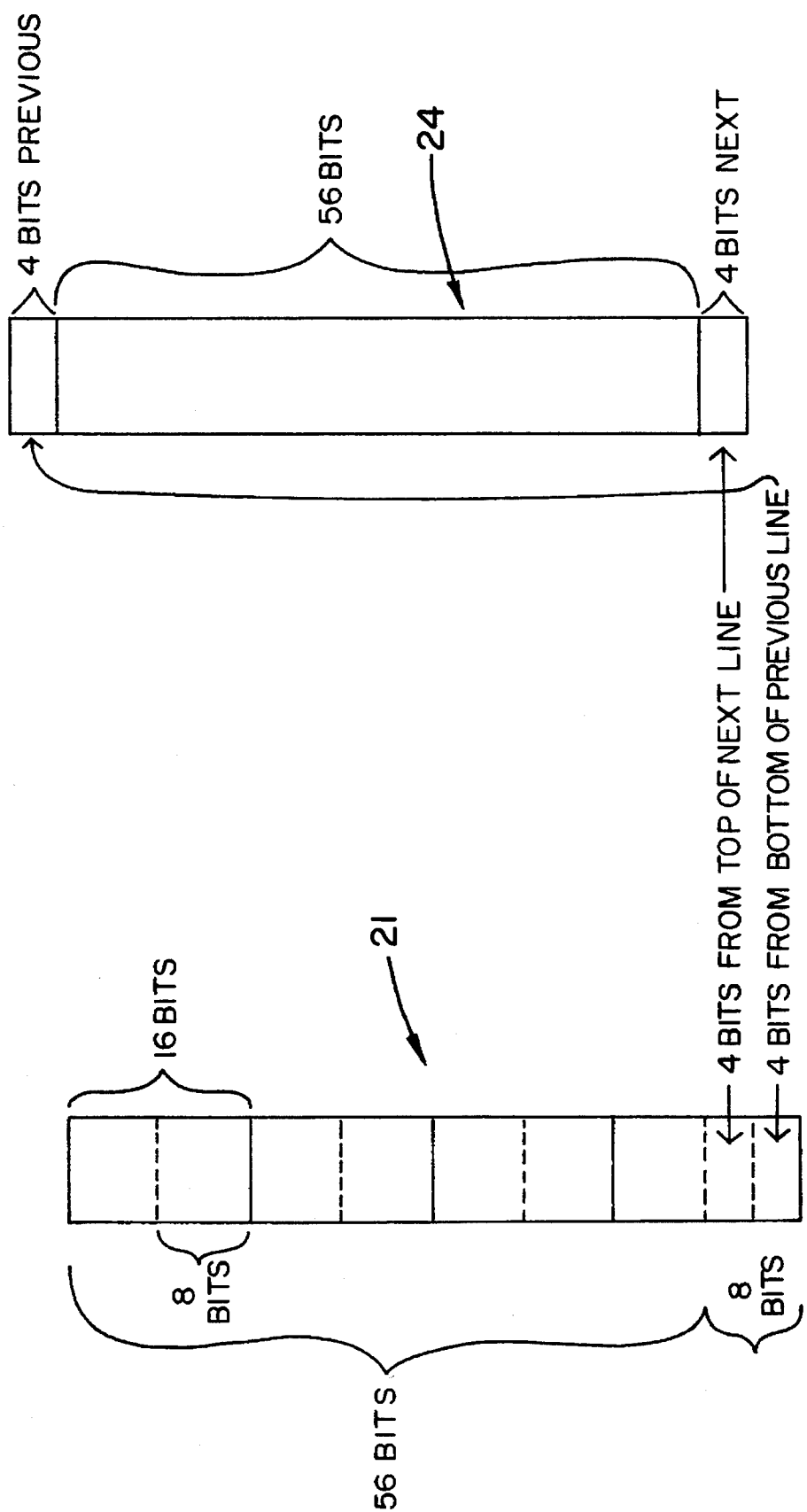
FIG. 12 is an illustration of an implementation of processing of 300 dpi data in the high speed buffer of FIG. 5.

With reference now to FIG. 12, the print enhancement hardware can use the four bits above and the four bits below the current print line in the neighborhood calculation at the top and bottom boundaries (as shown in FIG. 7). The 56 bits of data for the current line are followed in the printer memory 21 by the four bits from the top of the next line and the four bits from the bottom of the previous line. The enhancement hardware 23, using direct memory access, reads the four bits from the bottom of the previous line into the top of the 64 bit column in the buffer 24 and reads the four bits from the top of the next line into the buffer below the current print line data. The data is then in position for use in the comparison portion of the print quality enhancement hardware 23. In the general case, in the main memory 21, the actual nozzle data is contained in the buffer for each line to be printed beginning at the top of the memory 21 for whatever number of nozzles are to be fired and have associated firing data. After the last bit of data for the current print line, the four bits of data from the top of the next line are placed in sequence in the printer memory. The four bits from the bottom of the previous line are placed at the bottom of the buffer 21. In FIG. 12, the positioning of the data for 56 bits of nozzle data is shown. If the current line data is less than 56 bits, the four bits of data for the next line are shifted upward to lie at the end of the data for the current line.

We claim:

1. A print quality enhancement apparatus for a dot matrix printer comprising: means for receiving, prior to printing, lower resolution data for a portion of a page to be printed for each print element of a multiple print element print head in a dot matrix printer;

means for creating, prior to and during printing, higher resolution data from the lower resolution data for a portion of a page to be printed; and means for correcting, prior to and during printing, the higher resolution data for a portion of a page to be printed to remove unprintable dots by looking ahead at dots to be printed in the higher resolution data, the higher resolution data being positioned on a higher resolution grid and the lower resolution data being positioned on a lower resolution grid, and including means responsive to the status of a history bit indicative of a delay status relative to the low resolution grid of a previous dot position on the higher resolution grid.

2. The apparatus of claim 1 in which the means for correcting includes means for using the lower resolution data to effect the correction.

3. The apparatus of claim 1 in which the lower resolution data for each print element is received sequentially by the means for receiving lower resolution data.

4. The apparatus of claim 3 in which the means for receiving lower resolution data includes a buffer whose size is equal to the number of print elements plus additional data storage locations for lines above and below the data for print elements in use for the current line.

5. Print quality enhancement apparatus for a dot matrix printer having a print head with a number of print elements arranged to provide a vertical resolution, in the direction of movement of print media past the print head, and horizontal resolution, in the direction of print head movement, comprising:

means for receiving, prior to printing, lower horizontal resolution data for print elements of the print head;

means for creating, prior to and during printing, higher horizontal resolution data from the lower horizontal resolution data; and means for correcting, prior to and during printing, the higher horizontal resolution data to remove unprintable dots by looking ahead at dots to be printed in the higher resolution data, the higher resolution data being positioned on a higher resolution grid and the lower resolution data being positioned on a lower resolution grid, and including means responsive to the status of a history bit indicative of a delay status relative to the low resolution grid of a previous dot position on the higher resolution grid.

6. A method for enhancing print quality in a dot matrix printer comprising the steps of:

receiving, prior to printing, lower resolution data for a portion of a page to be printed for print elements of a multiple print element print head in a dot matrix printer;

creating, prior to and during printing, higher resolution data from the lower resolution data for a portion of the page to be printed; and correcting, prior to and during printing, the higher resolution data for a portion of a page to be printed to remove unprintable dots by looking ahead at dots to be printed in the higher resolution data, the higher resolution data being positioned on a higher resolution grid and the lower resolution data being positioned on a lower resolution grid, and by using the status of a history bit indicative of the delay status relative to the low resolution grid of a previous dot position on the higher resolution grid.

7. The method of claim 6 in which the step of correcting the high resolution data includes the substep of using the lower resolution data to effect the correction.

8. A print quality enhancement apparatus for a dot matrix printer comprising:

means for storing lower resolution data for a portion of a page to be printed for print elements of a multiple print element print head in a dot matrix printer as well as part of a previous portion of a page to be printed and a part of a succeeding portion of a page to be printed;

means for receiving, prior to and during printing, the lower resolution data from the means for storing;

means for creating, prior to and during printing, higher resolution data from received lower resolution data; and means for correcting, prior to and during printing, the higher resolution data for a portion of a page to be printed to remove unprintable dots by looking ahead at dots to be printed in the higher resolution data, the higher resolution data being positioned on a higher resolution grid and the lower resolution data being positioned on a lower resolution grid, and including means responsive to the status of a history bit indicative of a delay status relative to the low resolution grid of a previous dot position on the higher resolution grid.

* * * * *